United States Patent

[11] 3,576,317

| [72] | Inventor | Richard L. Huntington |
| | | Hancock County, Ohio (R. 1, Van Buren, Ohio, 45889) |
| [21] | Appl. No. | 814,063 |
| [22] | Filed | Apr. 7, 1969 |
| [45] | Patented | Apr. 27, 1971 |

[54] PACKED TOWER DESIGN
3 Claims, 9 Drawing Figs.

| [52] | U.S. Cl. | 261/98 |
| [51] | Int. Cl. | B01f 3/04 |
| [50] | Field of Search | 261/94—98 (C.T.) |

[56] References Cited
UNITED STATES PATENTS

| 999,320 | 8/1911 | Kyll | 261/95X |
| 1,743,974 | 1/1930 | Mallet | 261/97X |
| 2,108,680 | 2/1938 | Lakey | (261/110) |
| 2,609,888 | 9/1952 | Beringer | 261/97X |
| 3,006,436 | 10/1961 | Starbuck et al. | 261/95X |
| 3,038,790 | 6/1962 | Beggs et al. | 261/97 |
| 3,216,708 | 11/1965 | Ferry | (261/111) |
| 3,346,246 | 10/1967 | Loetel et al. | (261/103) |

*Primary Examiner*—Tim R. Miles
*Attorney*—Owen and Owen

ABSTRACT: The invention is a horizontal crossflow packed bed absorber having a hollow shell and a distributor for distributing liquid downwardly through the packed bed absorber. The shell has corrugated side and bottom walls, an inlet grill and an outlet grill defining a central compartment containing tower packing. The side and bottom wall corrugations are at an angle to both the liquid flow and the gas flow.

PATENTED APR 27 1971

INVENTOR.
RICHARD L. HUNTINGTON

PATENTED APR 27 1971

INVENTOR.
RICHARD L. HUNTINGTON

PATENTED APR 27 1971 3,576,317

INVENTOR.
RICHARD L. HUNTINGTON

PACKED TOWER DESIGN

This invention relates to packed tower design and more particularly to the elimination of gas and liquid channeling adjacent to the wall of the packed tower caused by voids in the packing and the discontinuity of the packing and wall.

It is an object of the present invention to provide improved packed tower performance in a simple and efficient manner, which can be readily incorporated into packed tower design.

Another object of the present invention is to provide packed fume scrubbers which are rigid, light in weight and can be built in various shapes without a reduction in absorption efficiency due to variation in the ratio of the packed cross-sectional area and wall perimeter.

Still a further object of the present invention is to provide a packed fume scrubber which can be manufactured and sold in large quantities at a comparatively low cost, and can be conveniently utilized where ever needed.

Still additional objects benefits, and advantages of this invention will become evident from a study of the following detailed description taken in conjunction with the accompanying drawings, in which.

Figure 1:
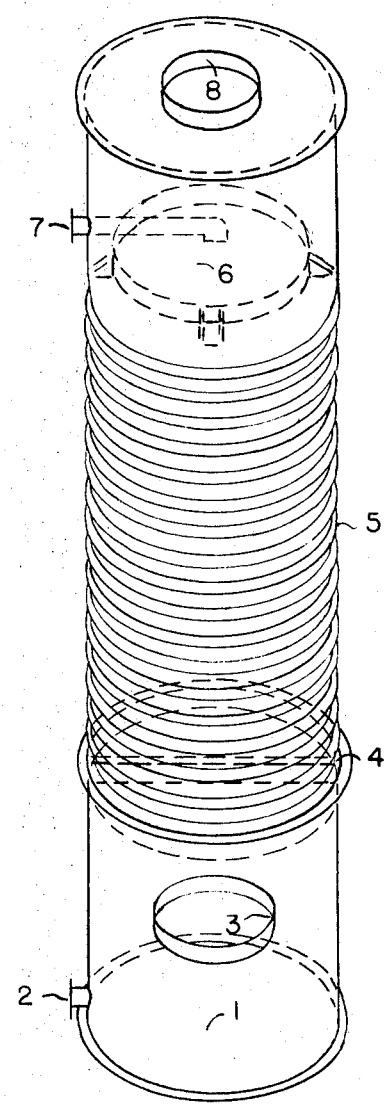
FIG. 1 is a perspective view of a circular counterflow packed tower made in accordance with the present invention.
Figure 8:
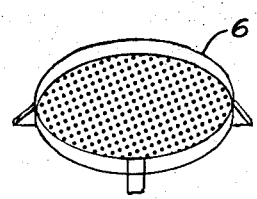
FIG. 8 is a perspective view of a typical liquid distributor for use with the packed tower shown in FIG. 1.
Figure 9:
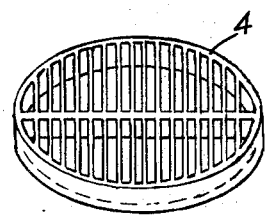
FIG. 9 is a perspective view of a typical packed bed support plate for use with the packed tower shown in FIG. 1.

Referring now specifically to FIG. 1, a circular packed tower made in accordance with the present invention is shown to include a hollow shell having a liquid sump 1, gas inlet 2, liquid outlet 3, tower packing support plate 4 corrugated wall packed tower chamber 5, sieve plate liquid distributor 6, liquid inlet 7 and gas outlet 8.

Figure 2:
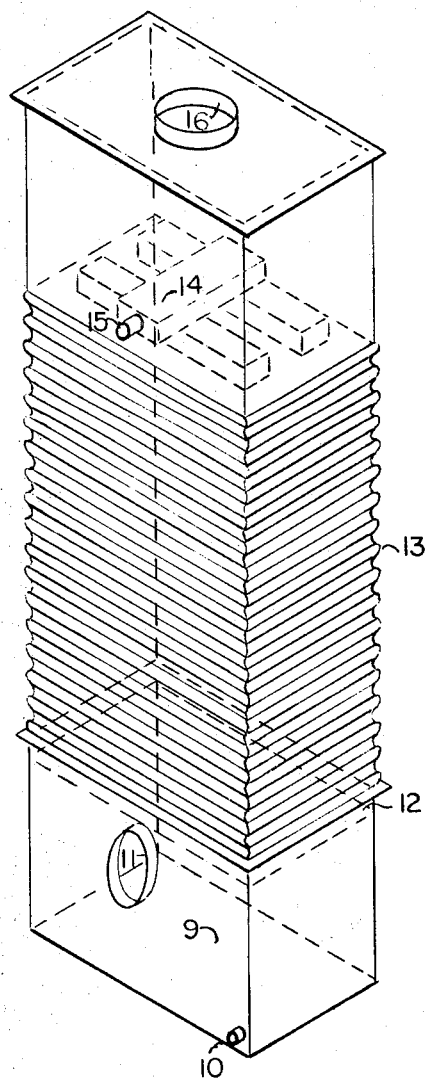
FIG. 2 is a perspective view of a rectangular counterflow packed tower made in accordance with the present invention.
Figure 6:
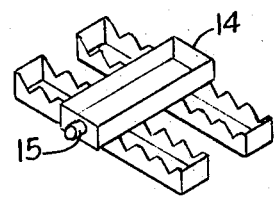
FIG. 6 is a perspective view of a typical rectangular packed bed support plate for use with the packed tower shown in FIG. 2.
Figure 7:
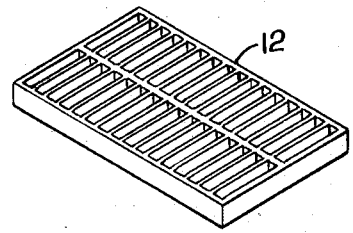
FIG. 7 is a perspective view of a typical rectangular packed bed support plate for use with the packed tower shown in FIG. 2.

Referring specifically now to FIG. 2, a rectangular packed tower made in accordance with the present invention is shown to include a hollow shell having a liquid sump 9, liquid outlet 10, gas inlet 11, tower packing support plate 12, corrugated wall packed chamber 13, liquid distributor 14, liquid inlet 15 and gas outlet 16.

In countercurrent operation the liquid enters the top of the hollow shell through the inlet nozzles 7 and 15, is distributed uniformly across the packed bed by the liquid distributor, flows downward over the surface of the packing in the corrugated wall chamber, through the support plate into the liquid sump. Gas enters through the base inlet flows upward through the support plate, packed chamber and exits through the gas outlet at the top of the tower.

In cocurrent operation both liquid and gas enter through the top of the tower and flow downward through the corrugated walled chamber support plate and exit at the base.

Liquid which flows outward to the wall under both countercurrent and cocurrent flow operation flows down each wall corrugation and is continuously returned to the packing.

The increase in collection efficiency with corrugated walls is more pronounced for a rectangular packed tower than in a circular tower due to the larger wall periphery which varies with packed tower size.

The corrugated radius of curvature is matched to the physical dimension of the radius of curvature of the packing with a depth equivalent to the radius of curvature of the tower fill.

Figure 4:
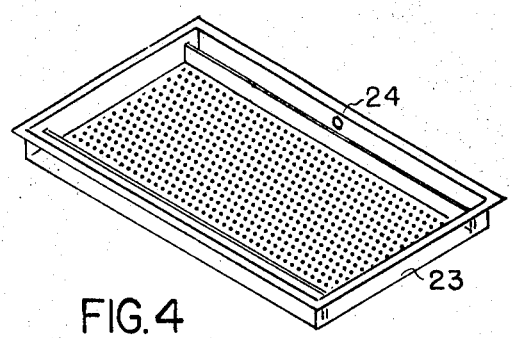
FIG. 4 is a perspective view of a crossflow liquid distributor for use with the absorber shown in FIG. 3.
Figure 3:
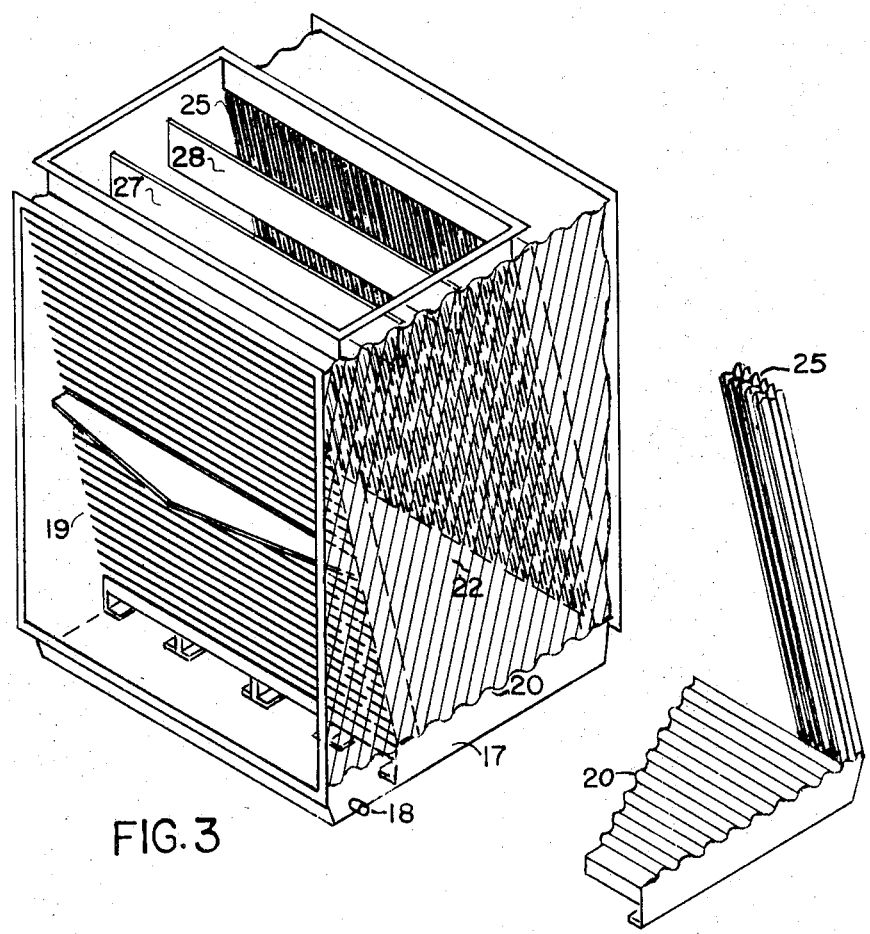
FIG. 3 is a perspective view of a rectangular crossflow packed tower made in accordance with the present invention.
Figure 5:
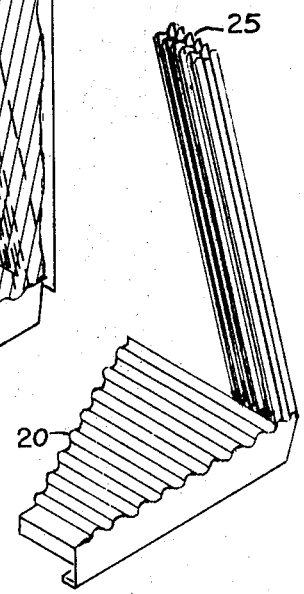
FIG. 5 is a diagrammatic view of the crossflow packed bed support plate and outlet grill of the absorber shown in FIG. 3 and made in accordance with the present invention.

Referring now specifically to FIG. 3, a rectangular crossflow packed tower made in accordance with the present invention is shown to include a hollow shell having a liquid sump 17, liquid outlet 28, gas inlet grill 19, corrugated support plate 20, corrugated wall packed tower chamber 22, sieve plate liquid distributor 23, see FIG. 4, liquid inlet 24, and corrugated outlet grill 25.

In operation, the liquid enters the tower through liquid inlet 24 and is distributed across the packing in the corrugated walled chamber 22 by the distributor 23, which is supported by baffles 27, 28, and flows downward through the packing to the sump 17. As the liquid flows down through the packed bed the liquid which flows to the corrugated wall is returned to the packing in a forward direction by the wall corrugations. Liquid which flows to the front of the sloping bed is returned to the face of the bed by the blades of the horizontal grill 19, which slope in the direction of the bed. The water which is returned to the front of the bed washes the face of the packed bed and prevents the buildup of solid matter on the face of the packed bed. Gas enters the face of the grill and passes horizontally through the packed bed in contact with the water. The carry over of liquid is prevented by the back of the packed bed which is operated dry and by the corrugated grill 25 at the back of the bed. Liquid which passes downwardly through the packed bed falls from the sloped bottom wall of the support plate 20 into the liquid sump 17.

While this invention has been described with particular reference to the construction shown in the drawing and while various changes may be made in the detail construction, including internal corrugated wall liners, it shall be understood that such changes shall be within the spirit and scope of the present invention as described by the appending claims.

What is now claimed as new and desired to be protected by Letters Patent of the United States is:

I claim:

1. A horizontal crossflow packed bed absorber comprising, in combination, a hollow shell having means to distribute liquid downwardly therethrough and corrugated side and bottom walls defining a central compartment, said central compartment containing suitable tower packing, said sidewall corrugations tilted in the direction of gas flow and at an angle to both the direction of gas and liquid flow and said bottom corrugations being at an angle to both liquid and gas flow.

2. A horizontal crossflow packed bed absorber as set forth in claim 1, wherein said hollow shell has a slotted horizontal inlet grill and a slotted vertical outlet grill, said inlet and outlet grills tilted in the direction of gas flow, with said horizontal inlet grill slots sloping toward the face of the bed so as to return the irrigation liquid to the face of the packed bed.

3. A horizontal crossflow packed bed absorbed as set forth in claim 2, said hollow shell having a plurality of internal baffles, said baffles being perpendicular to the direction of gas flow and wherein said means for distributing liquid is supported on said internal baffles.